(12) United States Patent
Davydov

(10) Patent No.: US 10,530,441 B2
(45) Date of Patent: Jan. 7, 2020

(54) TRANSPORT BLOCK SELECTION FOR 1024 QUADRATURE AMPLITUDE MODULATION (QAM)

(71) Applicant: Intel Corporation, Santa Clara, CA (US)

(72) Inventor: Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/277,901

(22) Filed: Feb. 15, 2019

(65) Prior Publication Data

US 2019/0260440 A1 Aug. 22, 2019

Related U.S. Application Data

(60) Provisional application No. 62/632,569, filed on Feb. 20, 2018.

(51) Int. Cl.
*H04B 7/04* (2017.01)
*H04B 7/0456* (2017.01)
*H04L 27/34* (2006.01)
*H04L 1/00* (2006.01)

(52) U.S. Cl.
CPC ......... *H04B 7/0478* (2013.01); *H04B 7/0482* (2013.01); *H04L 1/0003* (2013.01); *H04L 1/0009* (2013.01); *H04L 27/3405* (2013.01)

(58) Field of Classification Search
CPC ... H04B 7/0478; H04B 7/0482; H04L 1/0003; H04L 1/0009; H04L 27/3405
See application file for complete search history.

(56) References Cited

U.S. PATENT DOCUMENTS

| | | | | |
|---|---|---|---|---|
| 2015/0200746 A1* | 7/2015 | Pan | ........................... | H04L 1/00 370/329 |
| 2015/0215068 A1* | 7/2015 | Wu | ....................... | H04L 1/0003 370/329 |
| 2015/0381310 A1* | 12/2015 | Hammarwall | ........ | H04L 1/0003 370/329 |
| 2017/0070374 A1* | 3/2017 | Nakamura | ............ | H04L 1/0005 |
| 2018/0279337 A1* | 9/2018 | Kwon | ................. | H04L 27/0008 |
| 2018/0375697 A1* | 12/2018 | Chen | ..................... | H04L 1/0016 |

OTHER PUBLICATIONS

3GPP, "Technical Specification Group Radio Access Network; Evolved Universal Terrestrial Radio Access (E-UTRA); Physical layer procedures (Release 15)," 3GPP TS 36.213 V15.0.0 (Dec. 2017), 5G, 493 pages.

* cited by examiner

Primary Examiner — Freshteh N Aghdam
(74) Attorney, Agent, or Firm — Schwabe, Williamson & Wyatt, P.C.

(57) ABSTRACT

Various embodiments provide techniques to determine a TBS for use with 1024 QAM communications that use more than one multiple input, multiple output (MIMO) layer based on a reference TBS for use with 1024 QAM communications that use a single MIMO layer. The reference TBS may be determined based on a TBS index and a resource allocation for the communication. The TBS index may be determined based on a modulation and coding scheme (MCS) index. Other embodiments may be described and claimed.

21 Claims, 9 Drawing Sheets

TRANSPORT BLOCK SELECTION FOR 1024 QUADRATURE AMPLITUDE MODULATION (QAM)

CROSS REFERENCE TO RELATED APPLICATION

The present application claims priority to U.S. Provisional Patent Application No. 62/632,569, filed Feb. 20, 2018, and entitled "TRANSPORT BLOCK SELECTION FOR 1024 QUADRATURE AMPLITUDE MODULATION (QAM)," the entire disclosure of which is hereby incorporated by reference in its entirety.

FIELD

Embodiments of the present invention relate generally to the technical field of wireless communications, and more particularly to transport block selection for 1024 quadrature amplitude modulation (QAM).

BACKGROUND

New network deployments may enable higher order modulation schemes, such as 1024 quadrature amplitude modulation (QAM) to be used by a user equipment (UE) in some situations, such as small cell deployment. However, transport block size (TBS) is not currently defined for 1024 QAM.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
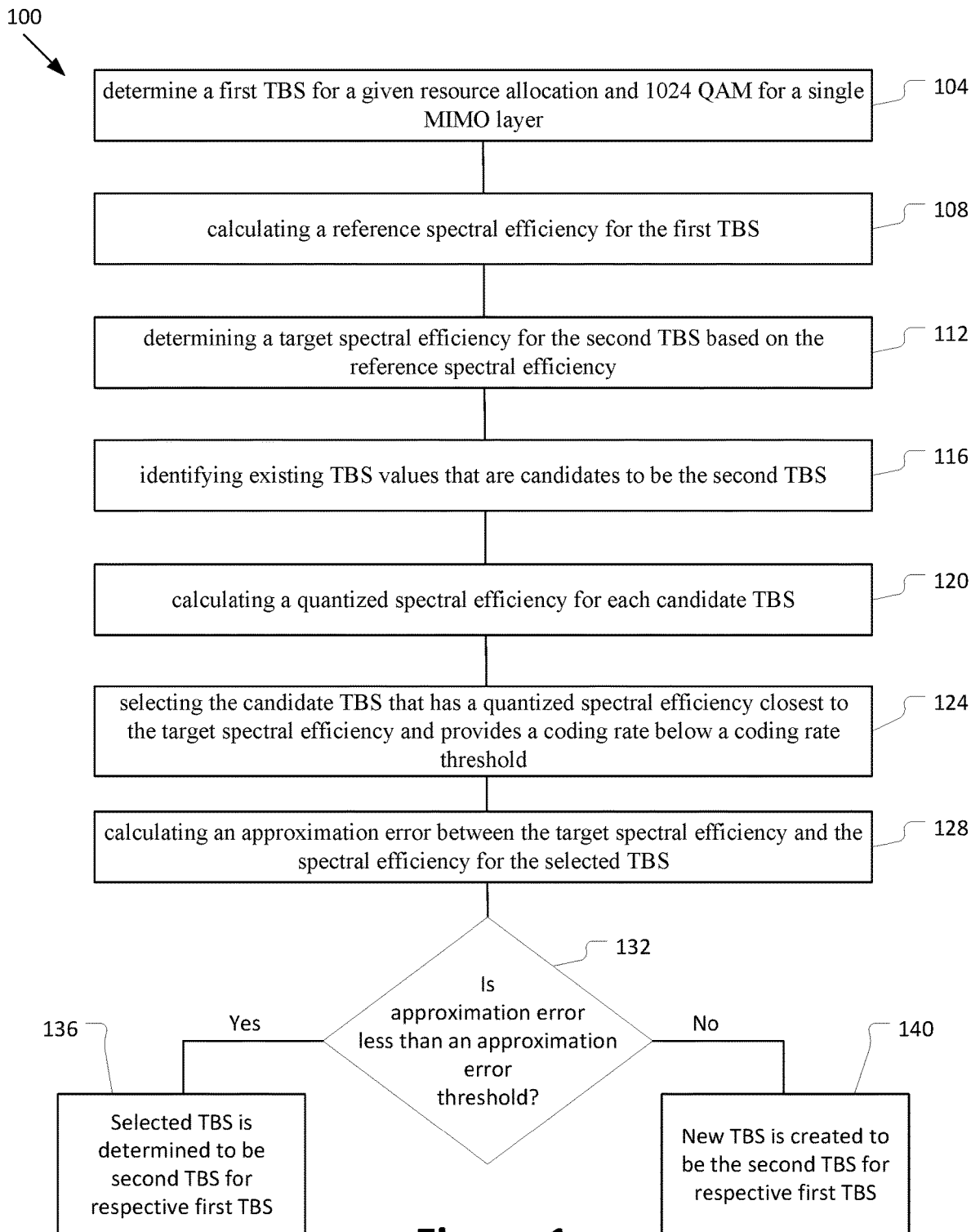
FIG. 1 illustrates a procedure for determining transport block size for more than one multiple input multiple output (MIMO) layers using 1024 quadrature amplitude modulation (QAM), in accordance with some embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Various embodiments provide techniques to determine a TBS for use with 1024 quadrature amplitude modulation (QAM) communications that use more than one multiple input, multiple output (MIMO) layer based on a reference TBS for use with 1024 QAM communications that use a single MIMO layer. The reference TBS may be determined based on a TBS index and a resource allocation (e.g., in physical resource blocks (PRBs)) for the communication. The TBS index may be determined based on a modulation and coding scheme (MCS) index.

In various embodiments, a user equipment (UE, e.g., UE 401, UE 402, and/or platform 600 discussed further below) may receive an MCS index (e.g., $I_{MCS}$) from a base station (e.g., evolved Node B (eNB) and/or next generation base station (gNB)), e.g., RAN node 411, RAN node 412, and/or system 500 discussed further below) of a wireless communication network. The MCS index may be received, for example, in downlink control information (DCI). The UE may determine, based on the MCS index, a modulation order to be used for a communication on the wireless communication network. The communication may be, for example, a downlink communication on the physical downlink shared channel (PDSCH) and/or another suitable communication (e.g., an uplink communication or a communication on a different channel). In some embodiments, the MCS index may be included in the same DCI that schedules the communication.

In various embodiments, the MCS index may indicate that 1024 QAM is to be used. The UE may further determine, based on the MCS index, a first transport block size (TBS) for one MIMO layer (also referred to as a reference TBS). In some embodiments, the UE may determine the first TBS based on the MCS index (e.g., the modulation order) and a resource allocation configured for the communication. The resource allocation may be a number of physical resource blocks (PRBs), and may correspond to a frequency bandwidth allocated for the communication. For example, the UE may determine a TBS index (e.g., $I_{TBS}$) based on the MCS index (e.g., according to Table 7.1.7.1-1 in 3GPP Technical Standard (TS) 36.213). The UE may then determine the first TBS based on the TBS index and the resource allocation (e.g., according to 7.1.7.2.1-1 of 3GPP TS 36.213).

The UE may be configured to perform the communication of a transport block using multiple MIMO layers, e.g., 2, 3, or 4 MIMO layers. In some embodiments, the UE may support multiple transport blocks (codewords), with each transport block mapped to one or more MIMO layers. For example, with 2 transport blocks each capable of being mapped to 1-4 MIMO layers, the UE may perform a communication using 1 to 8 MIMO layers.

In various embodiments, the UE may determine a second TBS to be used for the communication of a transport block (codeword) using multiple MIMO layers based on the first TBS and the number of MIMO layers to be used for the communication. In some embodiments, if the number of MIMO layers is less than a threshold, then the second TBS may be the first TBS multiplied by the number of MIMO layers. If the number of MIMO layers is greater than the threshold, then the second TBS may be determined based on the first TBS according to a table that associates values of the first TBS with respective values of the second TBS (which may or may not be an exact multiple of the first TBS).

For example, for a communication that uses transport block which is mapped to two MIMO layers and resource allocations of 0 to 55 PRBs, the second TBS may be the first TBS of the two times larger resource allocation mapped to a single MIMO layer. For resource allocations of greater than 55 PRBs (e.g., resource allocations of 56 to 110 PRBs), the second TBS may be determined based on the first TBS according to Table 1 below, wherein TBS_L1 is the first TBS for one MIMO layer and TBS_L2 is the second TBS for two MIMO layers.

TABLE 1

| TBS_L1 | TBS_L2 |
|---|---|
| 59256 | 119816 |
| 61664 | 124464 |
| 63776 | 128496 |
| 66592 | 133208 |
| 68808 | 137792 |
| 71112 | 142248 |
| 73712 | 146856 |
| 75376 | 151376 |
| 76208 | 152976 |
| 78704 | 157432 |
| 81176 | 161760 |
| 84760 | 169544 |
| 87936 | 175600 |
| 90816 | 181656 |
| 93800 | 187712 |

TABLE 1-continued

| TBS_L1 | TBS_L2 |
|---|---|
| 97896 | 195816 |
| 101840 | 203704 |
| 105528 | 211936 |
| 107832 | 214176 |
| 110136 | 220296 |
| 112608 | 226416 |
| 115040 | 230104 |
| 117256 | 236160 |
| 119816 | 236160 |
| 124464 | 236160 |
| 125808 | 251640 |
| 128496 | 254328 |
| 130392 | 266440 |
| 133208 | 266440 |
| 137792 | 275376 |

Additionally, or alternatively, for a communication that uses transport block mapped on three MIMO layers, for resource allocations of 1 to 36 PRBs the second TBS may be the first TBS of three times larger resource allocation mapped to a single MIMO layer. For resource allocations of 37 PRBs or greater (e.g., resource allocations from 37 to 110 PRBs), the second TBS may be determined based on the first TBS according to Table 2 below, wherein TBS_L1 is the first TBS for one MIMO layer and TBS_L3 is the second TBS for three MIMO layers.

TABLE 2

| TBS_L1 | TBS_L3 |
|---|---|
| 37888 | 115040 |
| 39232 | 119816 |
| 40576 | 119816 |
| 42368 | 125808 |
| 43816 | 133208 |
| 45352 | 137792 |
| 46888 | 142248 |
| 48936 | 146856 |
| 51024 | 152976 |
| 52752 | 157432 |
| 55056 | 165216 |
| 57336 | 171888 |
| 59256 | 177816 |
| 61664 | 185728 |
| 63776 | 191720 |
| 66592 | 199824 |
| 68808 | 205880 |
| 71112 | 214176 |
| 73712 | 221680 |
| 75376 | 226416 |
| 76208 | 230104 |
| 78704 | 236160 |
| 81176 | 245648 |
| 84760 | 254328 |
| 87936 | 254328 |
| 90816 | 275376 |
| 93800 | 284608 |
| 97896 | 293736 |
| 101840 | 305976 |
| 105528 | 314888 |
| 107832 | 324336 |
| 110136 | 324336 |
| 112608 | 339112 |
| 115040 | 339112 |
| 117256 | 351224 |
| 119816 | 363336 |
| 124464 | 375448 |
| 125808 | 375448 |
| 128496 | 375448 |
| 130392 | 391656 |
| 133208 | 391656 |
| 137792 | 391656 |

Additionally, or alternatively, for a communication that uses transport block mapped on four MIMO layers, for resource allocations of 1 to 27 PRBs the second TBS may be the first TBS of four times larger resource allocation mapped to a single MIMO layer. For resource allocations of 28 PRBs or greater (e.g., resource allocations of 28 to 100 PRBs), the second TBS may be determined based on the first TBS according to Table 3 below, wherein TBS_L1 is the first TBS for one MIMO layer and TBS_L4 is the second TBS for four MIMO layers.

TABLE 3

| TBS_L1 | TBS_L4 |
|--------|--------|
| 29296  | 115040 |
| 30576  | 124464 |
| 31704  | 125808 |
| 32856  | 133208 |
| 34008  | 137792 |
| 35160  | 137792 |
| 36696  | 146856 |
| 37888  | 151376 |
| 39232  | 157432 |
| 40576  | 161760 |
| 42368  | 169544 |
| 43816  | 175600 |
| 45352  | 181656 |
| 46888  | 187712 |
| 48936  | 195816 |
| 51024  | 203704 |
| 52752  | 211936 |
| 55056  | 220296 |
| 57336  | 230104 |
| 59256  | 236160 |
| 61664  | 245648 |
| 63776  | 254328 |
| 66592  | 266440 |
| 68808  | 275376 |
| 71112  | 284608 |
| 73712  | 293736 |
| 75376  | 299856 |
| 76208  | 305976 |
| 78704  | 314888 |
| 81176  | 324336 |
| 84760  | 339112 |
| 87936  | 351224 |
| 90816  | 363336 |
| 93800  | 375448 |
| 97896  | 391656 |
| 101840 | 391656 |
| 105528 | 422232 |
| 107832 | 422232 |
| 110136 | 422232 |
| 112608 | 452832 |
| 115040 | 452832 |
| 117256 | 471192 |
| 119816 | 471192 |
| 124464 | 501792 |
| 125808 | 501792 |
| 128496 | 501792 |
| 130392 | 501792 |
| 133208 | 538512 |
| 137792 | 538512 |

Various embodiments provide techniques for determining the values of the second TBS to include in Tables 1-3 above. For example, FIG. 1 illustrates a method 100 to determine a second TBS for a plurality of MIMO layers based on a first TBS for a single MIMO layer for 1024 QAM. At 104, the method 100 may include determining a first TBS for a given resource allocation and 1024 QAM for a transport block mapped to a single MIMO layer.

At 108, the method 100 may include calculating a reference spectral efficiency for the first TBS. The reference spectral efficiency may be for example, bits per second per Hertz ((b/s)/Hz) provided by the first TBS and one MIMO layer.

At 112, the method 100 may include determining a target spectral efficiency for the second TBS based on the reference spectral efficiency. The target spectral efficiency may be determined, for example, by scaling (e.g., multiplying) the reference spectral efficiency by the number of MIMO layers.

At 116, the method 100 may include identifying existing TBS values that are candidates to be the second TBS. The existing TBS values may be associated with different first TBS values and/or with different modulation orders. It may be preferable to reuse existing TBS values when possible rather than introducing new TBS values for 1024 QAM. The identified candidates may be the existing TBS values that are most likely to provide the target spectral efficiency without exceeding the coding rate threshold (e.g., to meet the criteria of operations 120 and 124).

At 120, the method 100 may include, for each candidate TBS, calculating a quantized spectral efficiency.

At 124, the method 100 may include selecting the candidate TBS that has a quantized spectral efficiency closest to the target spectral efficiency and also provides a coding rate below a coding rate threshold. The coding rate threshold may correspond to a maximum coding rate expected to be decoded by the UE, such as 0.931 (the ratio between the TBS and the number of coded bits).

At 128, the method 100 may include calculating an approximation error between the target spectral efficiency and the spectral efficiency for the selected TBS. At 132, the method 100 includes determining whether the approximation error is less than a threshold, such as 3% or another suitable value. If the approximation error is less than the threshold, then the selected TBS is determined to be the second TBS for the respective first TBS at 136.

If the approximation error is greater than the threshold, then, at 140 of method 100, a new TBS is created to be the second TBS. The new TBS may be determined as the TBS that provides a spectral efficiency that is closest to the target spectral efficiency, provides a coding rate below the coding rate threshold, and that can be divided into code blocks of the same size. For example, the second TBS created at 140 may be divisible by at least one of the supported code block sizes for the UE (e.g., code block sizes supported by turbo coding) excluding cyclic redundancy check (CRC).

In various embodiments, the method 100 may be repeated for all values of the first TBS that are supported for 1024 QAM. Accordingly, Tables 1, 2, and 3 described above may be determined according to method 100. For transport blocks mapped to two MIMO layers, the associations between the first TBS and second TBS of Table 1 that result in associating a second TBS that was previously supported for a different first TBS are shown below in Table 4. The remaining associations in Table 1 are previously supported in the 3GPP Technical Specification, but for different modulation orders (e.g., different MCS indexes).

TABLE 4

| TBS_L1 | TBS_L2 |
|--------|--------|
| 107832 | 214176 |
| 110136 | 220296 |
| 112608 | 226416 |
| 115040 | 230104 |
| 117256 | 236160 |
| 119816 | 236160 |
| 124464 | 236160 |
| 125808 | 251640 |

For transport blocks mapped to three MIMO layers, the associations between the first TBS and second TBS that result in associating a second TBS of Table 2 that was previously supported for a different first TBS are shown below in Table 5. The remaining associations in Table 2 are previously supported in the 3GPP Technical Specification, but for different modulation orders (e.g., different MCS indexes).

TABLE 5

| TBS_L1 | TBS_L3 |
|---|---|
| 105528 | 314888 |
| 107832 | 324336 |
| 110136 | 324336 |
| 112608 | 339112 |
| 115040 | 339112 |
| 117256 | 351224 |
| 119816 | 363336 |
| 124464 | 375448 |
| 125808 | 375448 |

For transport blocks mapped to four MIMO layers, the associations between the first TBS and second TBS of Table 3 that include creation of a new TBS (not previously supported by the 3GPP Technical Specification) are shown in Table 6. The remaining associations in Table 3 are previously supported in the 3GPP Technical Specification, but for different modulation orders (e.g., different MCS indexes).

TABLE 6

| TBS_L1 | TBS_L4 |
|---|---|
| 105528 | 422232 |
| 107832 | 422232 |
| 110136 | 422232 |
| 112608 | 452832 |
| 115040 | 452832 |
| 117256 | 471192 |
| 119816 | 471192 |
| 124464 | 501792 |
| 125808 | 501792 |

Figure 2:
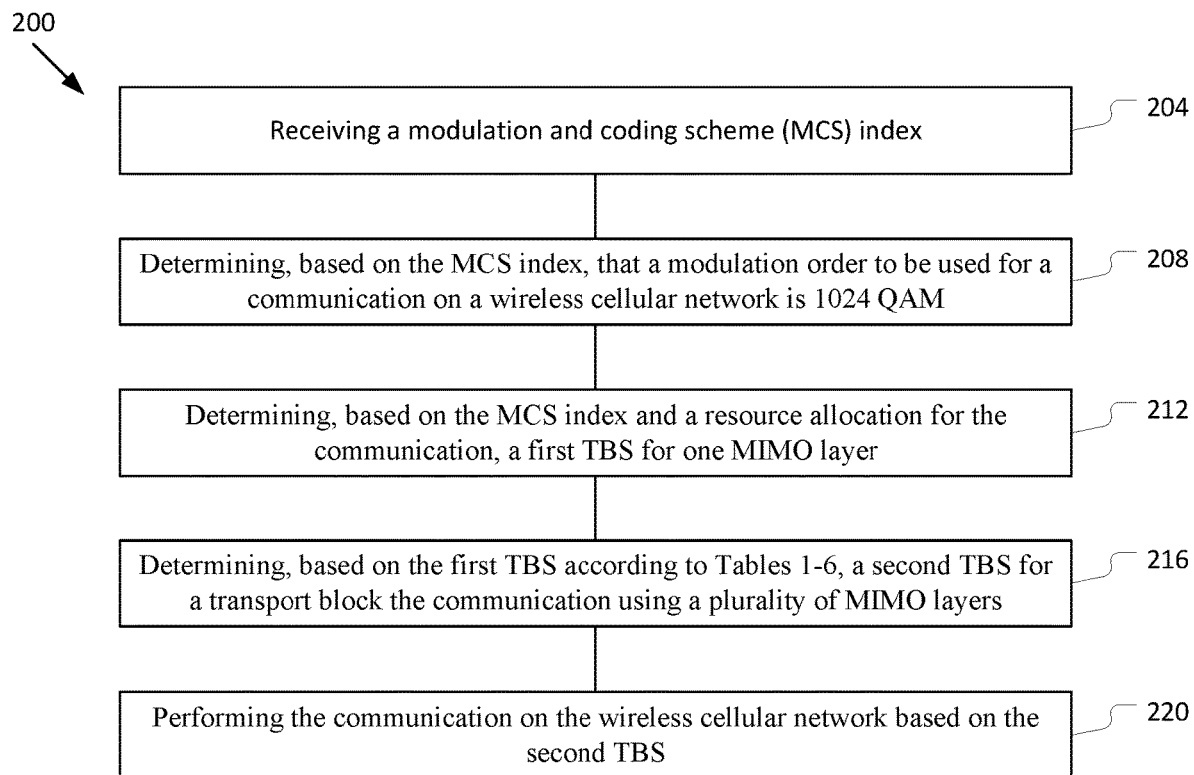
FIG. 2 illustrates an operation flow/algorithmic structure, in accordance with some embodiments.

FIG. 2 illustrates an operation flow/algorithmic structure 200 in accordance with some embodiments. In some embodiments, the operation flow/algorithmic structure may be performed by a UE or a portion thereof.

At 204, the operation flow/algorithmic structure 200 may include receiving a MCS index. The MCS index may be any suitable number of bits, such as 4, 5, 6, or another suitable number of bits. In some embodiments, the MCS index may be received via DCI, such as the same DCI that schedules a communication (e.g., a PDSCH) on a wireless cellular network.

At 208, the operation flow/algorithmic structure 200 may include determining, based on the MCS index, that a modulation order to be used for a communication on a wireless cellular network is 1024 QAM.

At 212, the operation flow/algorithmic structure 200 may include determining, based on the MCS index and a resource allocation for the communication, a first TBS for one MIMO layer. For example, in some embodiments, the determining at 212 may include determining a TBS index based on the MCS index, and determining the first TBS based on the TBS index and the resource allocation (e.g., in PRBs).

At 216, the operation flow/algorithmic structure 200 may include determining, based on the first TBS according to Tables 1, 2, 3, 4, 5, and/or 6 and/or a subset or superset thereof, a second TBS for the a transport block of the communication using a plurality of MIMO layers. For example, as described above, the number of MIMO layers used to transmit the transport block may determine which Table to use to determine the second TBS.

At 220, the operation flow/algorithmic structure 200 may include performing the communication on the wireless cellular network based on the second TBS. The communication may include the plurality of MIMO layers. Performing the communication may include, for example, receiving a PDSCH or another logical channel, and/or transmitting a message on the wireless cellular network.

Figure 3:
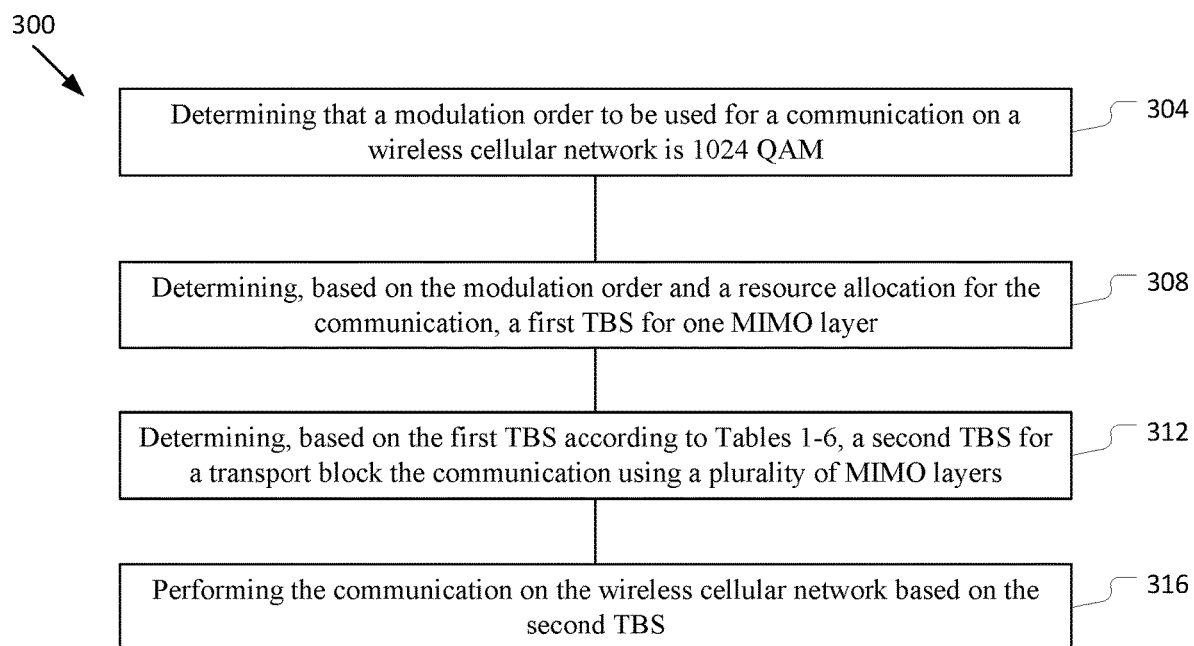
FIG. 3 illustrates another operation flow/algorithmic structure, in accordance with various embodiments.

FIG. 3 illustrates an operation flow/algorithmic structure 300 in accordance with some embodiments. In some embodiments, the operation flow/algorithmic structure may be performed by a gNB or a portion thereof.

At 304, the operation flow/algorithmic structure 300 may include determining that a modulation order to be used for a communication on a wireless cellular network is 1024 QAM. The communication may be, for example, a PDSCH transmission or another communication.

At 308, the operation flow/algorithmic structure 300 may include determining, based on the modulation order and a resource allocation for the communication, a first TBS for transport block mapped to one MIMO layer.

At 312, the operation flow/algorithmic structure 300 may include determining, based on the first TBS according to Tables 1, 2, 3, 4, 5, and/or 6 and/or a subset or superset thereof, a second TBS for a transport block the communication using a plurality of MIMO layers. For example, as described above, the number of MIMO layers used to the transmit transport block may determine which Table to use to determine the second TBS.

At 316, the operation flow/algorithmic structure 300 may include performing the communication on the wireless cellular network based on the second TBS. The communication may include the plurality of MIMO layers. Performing the communication may include, for example, transmitting one or more of the plurality of MIMO layers (e.g., one or more MIMO layers of a PDSCH or another logical channel, and/or receiving one or more MIMO layers of a message on the wireless cellular network).

Figure 4:
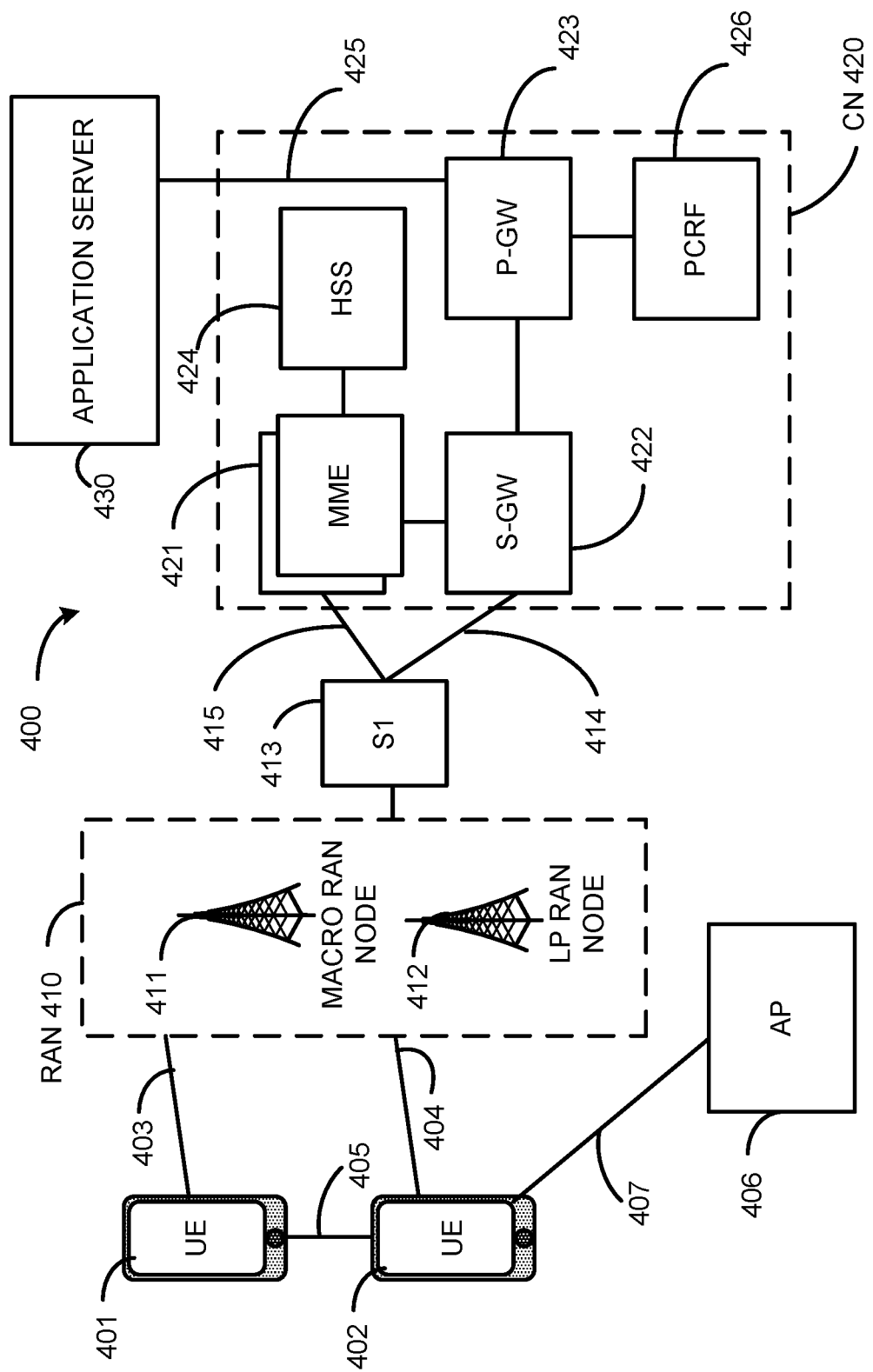
FIG. 4 illustrates an architecture of a system of a network, in accordance with some embodiments.

FIG. 4 illustrates an architecture of a system 400 of a network in accordance with some embodiments. The system 400 is shown to include a user equipment (UE) 401 and a UE 402. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 401 and 402 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410—the RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections (or channels) 403 and 404, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 405 may be used in vehicular applications and communications technologies, which are often referred to as V2X systems. V2X is a mode of communication where UEs (for example, UEs 401, 402) communicate with each other directly over the PC5/SL interface 105 and can take place when the UEs 401, 402 are served by RAN nodes 411, 412 or when one or more UEs are outside a coverage area of the RAN 410. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 401, 402, RAN nodes 411, 412, application servers 430, and pedestrian UEs 401, 402 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 401, 402 may be implemented/employed as Vehicle Embedded Communications Systems (VECS) or vUEs.

The UE 402 is shown to be configured to access an access point (AP) 406 (also referred to as also referred to as "WLAN node 406", "WLAN 406", "WLAN Termination 406" or "WT 406" or the like) via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below). In various embodiments, the UE 402, RAN 410, and AP 406 may be configured to utilize LTE-WLAN aggregation (LWA) operation and/or WLAN LTE/WLAN Radio Level Integration with IPsec Tunnel (LWIP) operation. The LWA operation may involve the UE 402 in RRC_CONNECTED being configured by a RAN node 411, 412 to utilize radio resources of LTE and WLAN. LWIP operation may involve the UE 402 using WLAN radio resources (e.g., connection 407) via Internet Protocol Security (IPsec) protocol tunneling to authenticate and encrypt packets (e.g., internet protocol (IP) packets) sent over the connection 407. IPsec tunneling may include encapsulating entirety of original IP packets and adding a new packet header thereby protecting the original header of the IP packets.

The RAN 410 can include one or more access nodes that enable the connections 403 and 404. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and the serving gateway (S-GW) 422, and the S1-mobility management entity (MME) interface 415, which is a signaling interface between the RAN nodes 411 and 412 and MMEs 421.

In this embodiment, the CN 420 comprises the MMES 421, the S-GW 422, the Packet Data Network (PDN) Gateway (P-GW) 423, and a home subscriber server (HSS) 424. The MMES 421 may be similar in function to the control plane of legacy Serving General Packet Radio Service (GPRS) Support Nodes (SGSN). The MMES 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the EPC network 423 and external networks such as a network including the application server 430 (alternatively referred to as application function (AF)) via an Internet Protocol (IP) interface 425. Generally, the application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be a node for policy enforcement and charging data collection. Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
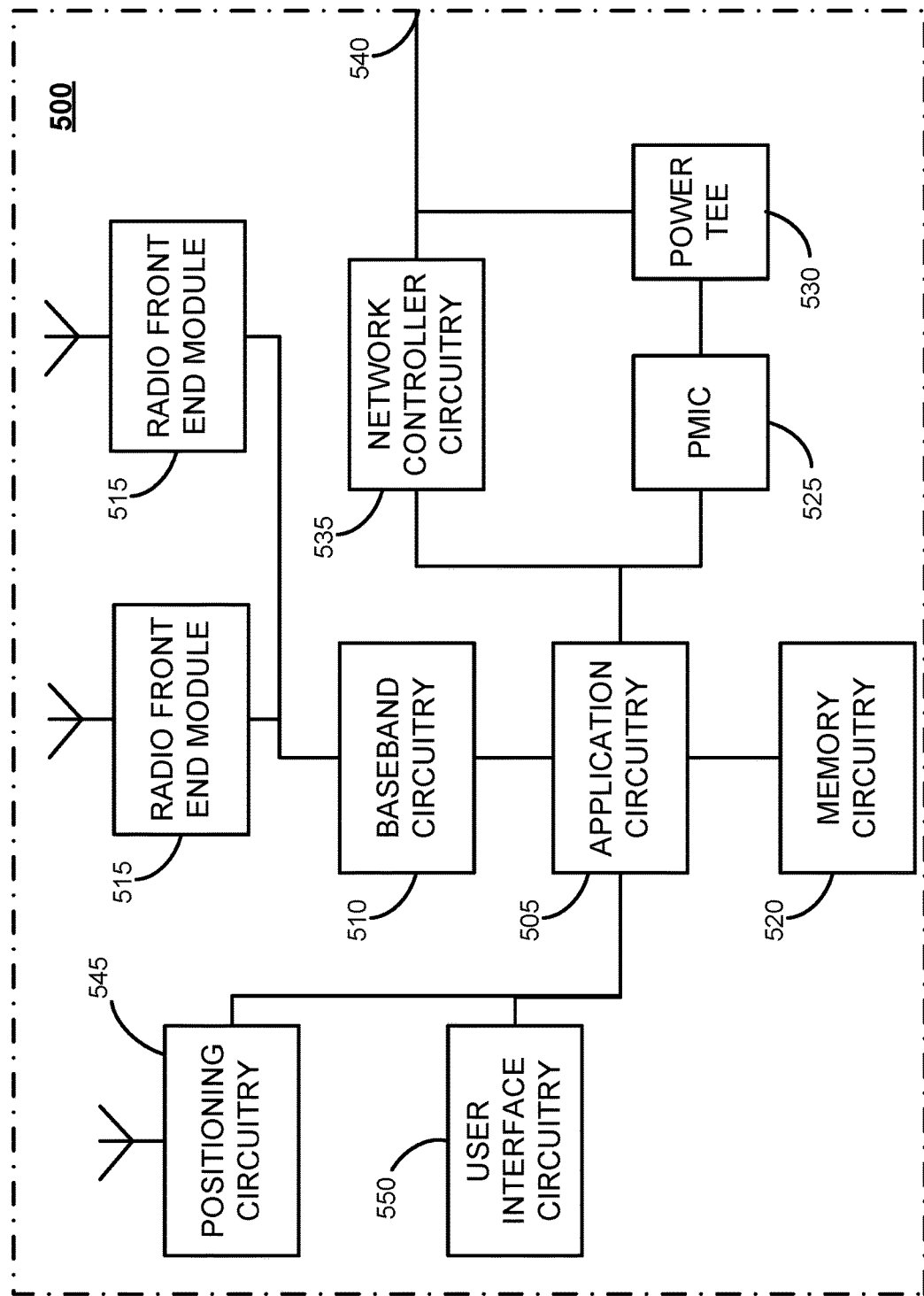
FIG. 5 illustrates an example of infrastructure equipment, in accordance with some embodiments.

FIG. 5 illustrates an example of infrastructure equipment 500 in accordance with various embodiments. The infrastructure equipment 500 (or "system 500") may be implemented as a base station, radio head, RAN node, etc., such as the RAN nodes 411 and 412, and/or AP 406 shown and described previously. In other examples, the system 500 could be implemented in or by a UE, application server(s) 430, and/or any other element/device discussed herein. The system 500 may include one or more of application circuitry 505, baseband circuitry 510, one or more radio front end modules 515, memory 520, power management integrated circuitry (PMIC) 525, power tee circuitry 530, network controller 535, network interface connector 540, satellite positioning circuitry 545, and user interface 550. In some embodiments, the system 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 420 may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 505 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or I/O), memory card controllers such as Secure Digital (SD/) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 505 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 500 may not utilize application circuitry 505, and instead may include a special-purpose processor/controller to process IP data received from an EPC or SGC, for example.

Additionally or alternatively, application circuitry 505 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 505 may comprise logic blocks or logic fabric including and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. Although not shown, baseband circuitry 510 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 510 may include protocol processing circuitry with one or more instances of control circuitry (not shown) to provide control functions for the digital baseband circuitry and/or radio frequency circuitry (for example, the radio front end modules 515).

User interface circuitry 550 may include one or more user interfaces designed to enable user interaction with the system 500 or peripheral component interfaces designed to enable peripheral component interaction with the system 500. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 515 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 515. The RFEMs 515 may incorporate both millimeter wave antennas and sub-millimeter wave antennas.

The memory circuitry 520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 520 may be implemented as one or more of solder down packaged integrated circuits, socketed memory modules and plug-in memory cards.

The PMIC 525 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 530 may provide for electrical power drawn from a network cable to provide both power supply and data connectivity to the infrastructure equipment 500 using a single cable.

The network controller circuitry 535 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 500 via network interface connector 540 using a physical connection, which may be electrical (commonly referred to as a "copper interconnect"), optical, or wireless. The network controller circuitry 535 may include one or more dedicated processors and/or FPGAs to communicate using one or more of the aforementioned protocol. In some implementations, the network controller circuitry 535 may include multiple controllers to provide connectivity to other networks using the same or different protocols.

The positioning circuitry 545, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 545 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 545 and/or positioning circuitry implemented by UEs 401, 402, or the like) to determine their GNSS position. The GNSS signals may include a pseudo-random code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 545 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 545 may provide data to application circuitry 505 which may include one or more of position data or time data. Application circuitry 505 may use the time data to synchronize operations with other radio base stations (e.g., RAN nodes 411, 412, or the like).

The components shown by FIG. 5 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 6:
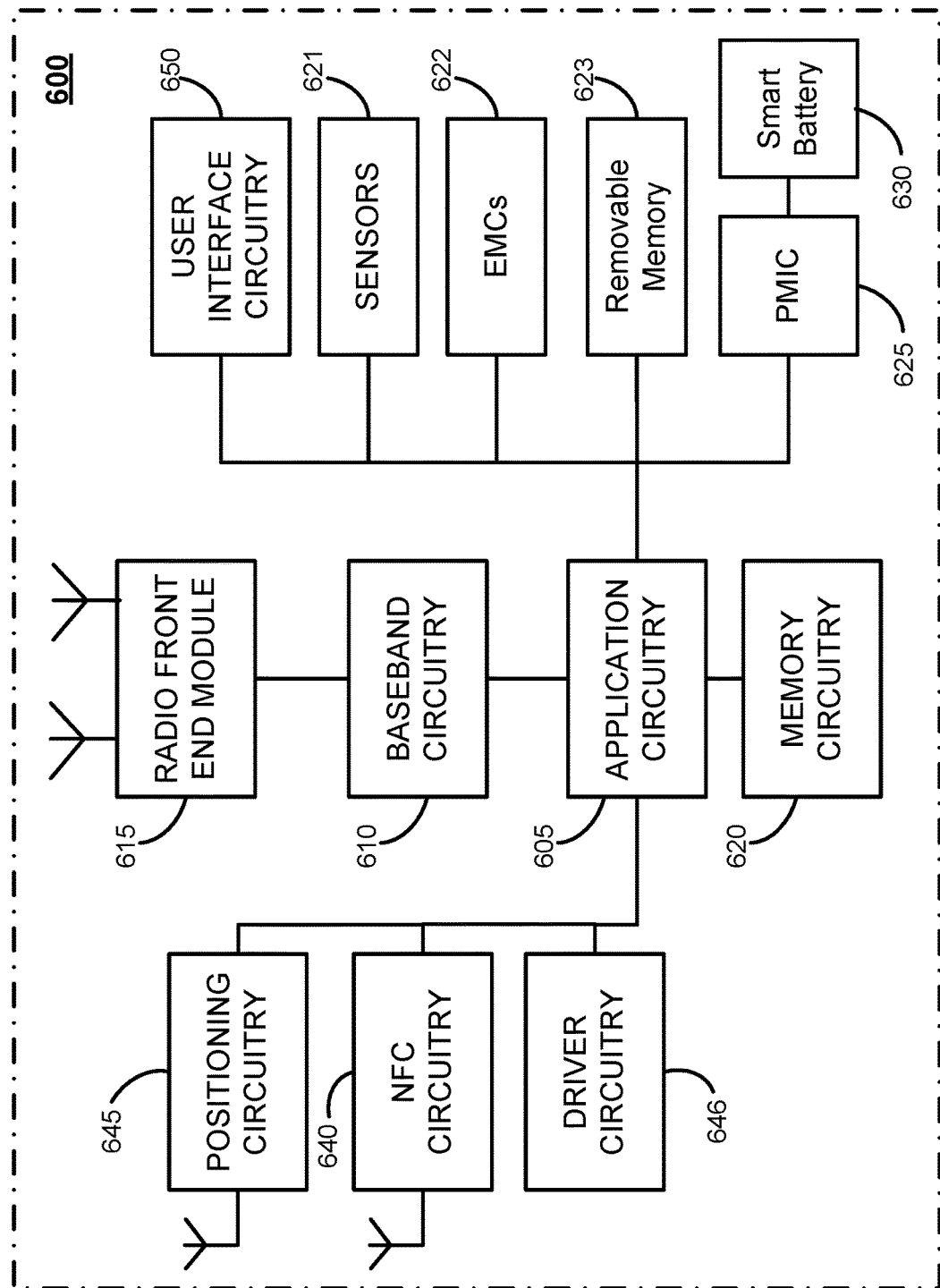
FIG. 6 illustrates an example computer platform, in accordance with some embodiments.

FIG. 6 illustrates an example of a platform 600 (or "device 600") in accordance with various embodiments. In embodiments, the computer platform 600 may be suitable for use as UEs 401, 402, application servers 430, and/or any other element/device discussed herein. The platform 600 may include any combinations of the components shown in the example. The components of platform 600 may be implemented as integrated circuits (ICs), portions thereof, discrete electronic devices, or other modules, logic, hardware, software, firmware, or a combination thereof adapted in the computer platform 600, or as components otherwise incorporated within a chassis of a larger system. The block diagram of FIG. 6 is intended to show a high level view of components of the computer platform 600. However, some of the components shown may be omitted, additional components may be present, and different arrangement of the components shown may occur in other implementations.

The application circuitry 605 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (TO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 600. In some embodiments, processors of application circuitry 505/605 may process IP data packets received from an EPC or 5GC.

Application circuitry 605 be or include a microprocessor, a multi-core processor, a multithreaded processor, an ultra-low voltage processor, an embedded processor, or other known processing element. In one example, the application circuitry 605 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 605 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 605 may be a part of a system on a chip (SoC) in which the application circuitry 605 and other components are formed into a single integrated circuit, or a single package, such as the Edison™ or Galileo™ SoC boards from Intel® Corporation.

Additionally or alternatively, application circuitry 605 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric including and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (for example, the radio front end modules 615).

The radio front end modules (RFEMs) 615 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 615. The RFEMs 615 may incorporate both millimeter wave antennas and sub-millimeter wave antennas.

The memory circuitry 620 may include any number and type of memory devices used to provide for a given amount of system memory. As examples, the memory circuitry 620 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 620 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 620 may be on-die memory or registers associated with the application circuitry 605. To provide for persistent storage of information such as data, applications, operating systems and so forth, memory circuitry 620 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 600 may incorporate the three-dimensional (3D) cross-point (XPOINT) memories from Intel® and Micron®.

Removable memory circuitry 623 may include devices, circuitry, enclosures/housings, ports or receptacles, etc. used to coupled portable data storage devices with the platform 600. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 600 may also include interface circuitry (not shown) that is used to connect external devices with the platform 600. The external devices connected to the platform 600 via the interface circuitry may include sensors 621, such as accelerometers, level sensors, flow sensors, temperature sensors, pressure sensors, barometric pressure sensors, and the like. The interface circuitry may be used to connect the platform 600 to electro-mechanical components (EMCs) 622, which may allow platform 600 to change its state, position, and/or orientation, or move or control a mechanism or system. The EMCs 622 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 600 may be configured to operate one or more EMCs 622 based on one or more captured events and/or instructions or control signals received from a service provider and/or various clients.

In some implementations, the interface circuitry may connect the platform 600 with positioning circuitry 645, which may be the same or similar as the positioning circuitry 545 discussed with regard to FIG. 5.

In some implementations, the interface circuitry may connect the platform 600 with near-field communication (NFC) circuitry 640, which may include an NFC controller coupled with an antenna element and a processing device. The NFC circuitry 640 may be configured to read electronic tags and/or connect with another NFC-enabled device.

The driver circuitry 646 may include software and hardware elements that operate to control particular devices that are embedded in the platform 600, attached to the platform 600, or otherwise communicatively coupled with the platform 600. The driver circuitry 646 may include individual drivers allowing other components of the platform 600 to interact or control various input/output (I/O) devices that may be present within, or connected to, the platform 600. For example, driver circuitry 646 may include a display driver to control and allow access to a display device, a touchscreen driver to control and allow access to a touchscreen interface of the platform 600, sensor drivers to obtain sensor readings of sensors 621 and control and allow access to sensors 621, EMC drivers to obtain actuator positions of the EMCs 622 and/or control and allow access to the EMCs 622, a camera driver to control and allow access to an embedded image capture device, audio drivers to control and allow access to one or more audio devices.

The power management integrated circuitry (PMIC) 625 (also referred to as "power management circuitry 625") may manage power provided to various components of the platform 600. In particular, with respect to the baseband circuitry 610, the PMIC 625 may control power-source selection, voltage scaling, battery charging, or DC-to-DC conversion. The PMIC 625 may often be included when the platform 600 is capable of being powered by a battery 630, for example, when the device is included in a UE 401, 402.

In some embodiments, the PMIC 625 may control, or otherwise be part of, various power saving mechanisms of the platform 600. For example, if the platform 600 is in an RRC_Connected state, where it is still connected to the RAN node as it expects to receive traffic shortly, then it may enter a state known as Discontinuous Reception Mode (DRX) after a period of inactivity. During this state, the platform 600 may power down for brief intervals of time and thus save power. If there is no data traffic activity for an extended period of time, then the platform 600 may transition off to an RRC_Idle state, where it disconnects from the network and does not perform operations such as channel quality feedback, handover, etc. The platform 600 goes into a very low power state and it performs paging where again it periodically wakes up to listen to the network and then powers down again. The platform 600 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 630 may power the platform 600, although in some examples the platform 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in V2X applications, the battery 630 may be a typical lead-acid automotive battery.

In some implementations, the battery 630 may be a "smart battery," which includes or is coupled with a Battery Management System (BMS) or battery monitoring integrated circuitry. The BMS may be included in the platform 600 to track the state of charge (SoCh) of the battery 630. The BMS may be used to monitor other parameters of the battery 630 to provide failure predictions, such as the state of health (SoH) and the state of function (SoF) of the battery 630. The BMS may communicate the information of the battery 630 to the application circuitry 605 or other components of the platform 600. The BMS may also include an analog-to-digital (ADC) convertor that allows the application circuitry 605 to directly monitor the voltage of the battery 630 or the current flow from the battery 630. The battery parameters may be used to determine actions that the platform 600 may perform, such as transmission frequency, network operation, sensing frequency, and the like.

A power block, or other power supply coupled to an electrical grid may be coupled with the BMS to charge the battery 630. In some examples, the power block 428 may be replaced with a wireless power receiver to obtain the power wirelessly, for example, through a loop antenna in the computer platform 600. In these examples, a wireless battery charging circuit may be included in the BMS. The specific charging circuits chosen may depend on the size of the battery 630, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 600 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an $I^2C$ interface, an SPI interface, point to point interfaces, and a power bus, among others.

Figure 7:
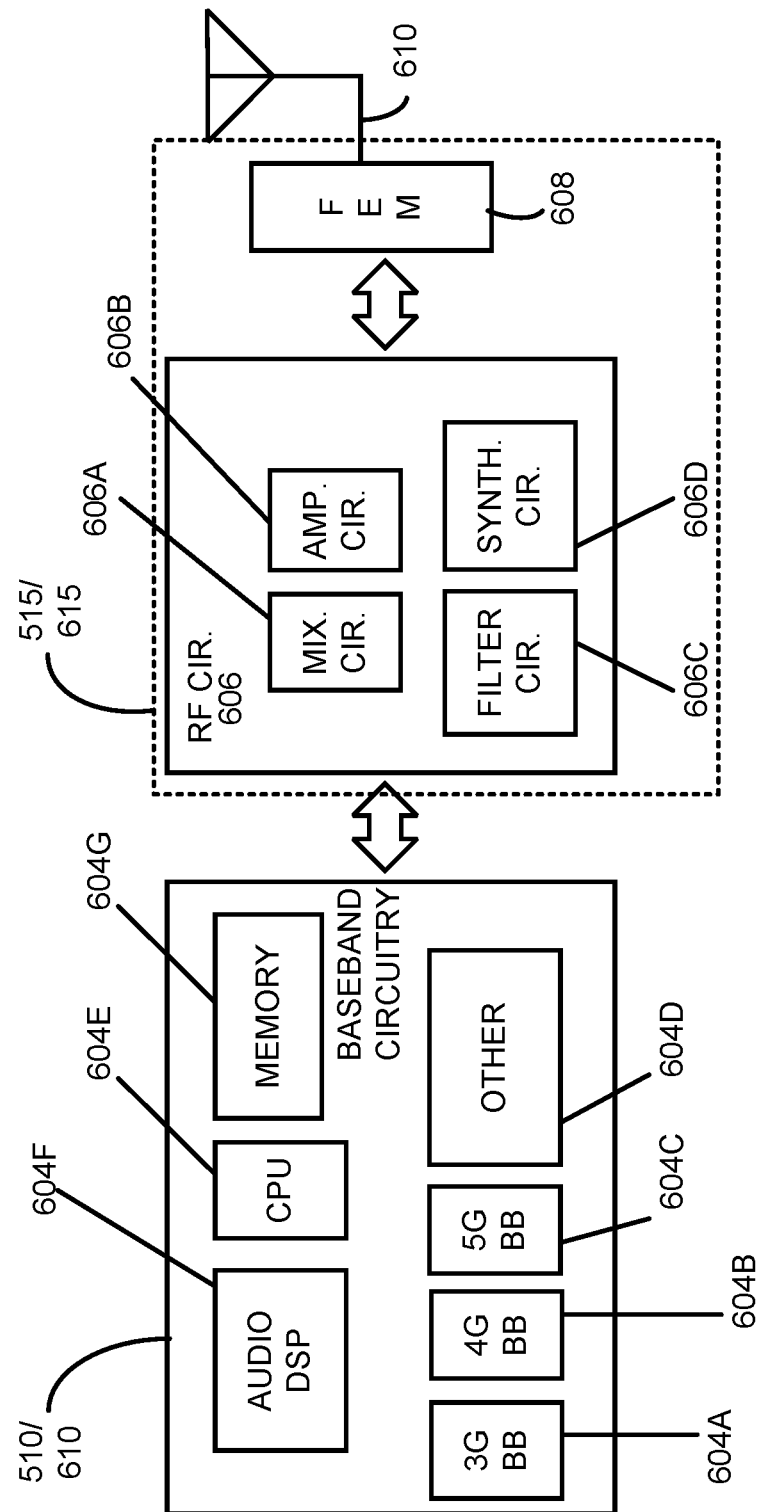
FIG. 7 illustrates example components of a baseband circuitry and a radio front end module, in accordance with some embodiments.

FIG. 7 illustrates example components of baseband circuitry 510/610 and radio front end modules (RFEM) 515/615 in accordance with some embodiments. As shown, the RFEM 515/615 may include Radio Frequency (RF) circuitry 606, front-end module (FEM) circuitry 608, one or more antennas 610 coupled together at least as shown.

The baseband circuitry 510/610 may include circuitry such as, but not limited to, one or more single-core or multi-core processors. The baseband circuitry 510/610 may include one or more baseband processors or control logic to process baseband signals received from a receive signal path of the RF circuitry 606 and to generate baseband signals for a transmit signal path of the RF circuitry 606. Baseband processing circuity 510/610 may interface with the application circuitry 505/605 for generation and processing of the baseband signals and for controlling operations of the RF circuitry 606. For example, in some embodiments, the baseband circuitry 510/610 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 510/610 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 510/610 may include Fast-Fourier Transform (FFT), precoding, or constellation mapping/demapping functionality. In some embodiments, encoding/decoding circuitry of the baseband circuitry 510/610 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 510/610 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 510/610 and the application circuitry 505/605 may be implemented together such as, for example, on a system on a chip (SOC).

In some embodiments, the baseband circuitry 510/610 may provide for communication compatible with one or more radio technologies. For example, in some embodiments, the baseband circuitry 510/610 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 510/610 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 510/610. RF circuitry 606 may also include a transmit signal path which may include circuitry to up-convert baseband signals provided by the baseband circuitry 510/610 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 510/610 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 510/610 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 510/610 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 510/610 or the applications processor 505/605 depending on the desired output frequency. In some embodiments, a divider control input (e.g., N) may be determined from a look-up table based on a channel indicated by the applications processor 505/605.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

Processors of the application circuitry 505/605 and processors of the baseband circuitry 510/610 may be used to execute elements of one or more instances of a protocol stack. For example, processors of the baseband circuitry 510/610, alone or in combination, may be used execute Layer 3, Layer 2, or Layer 1 functionality, while processors of the baseband circuitry 510/610 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
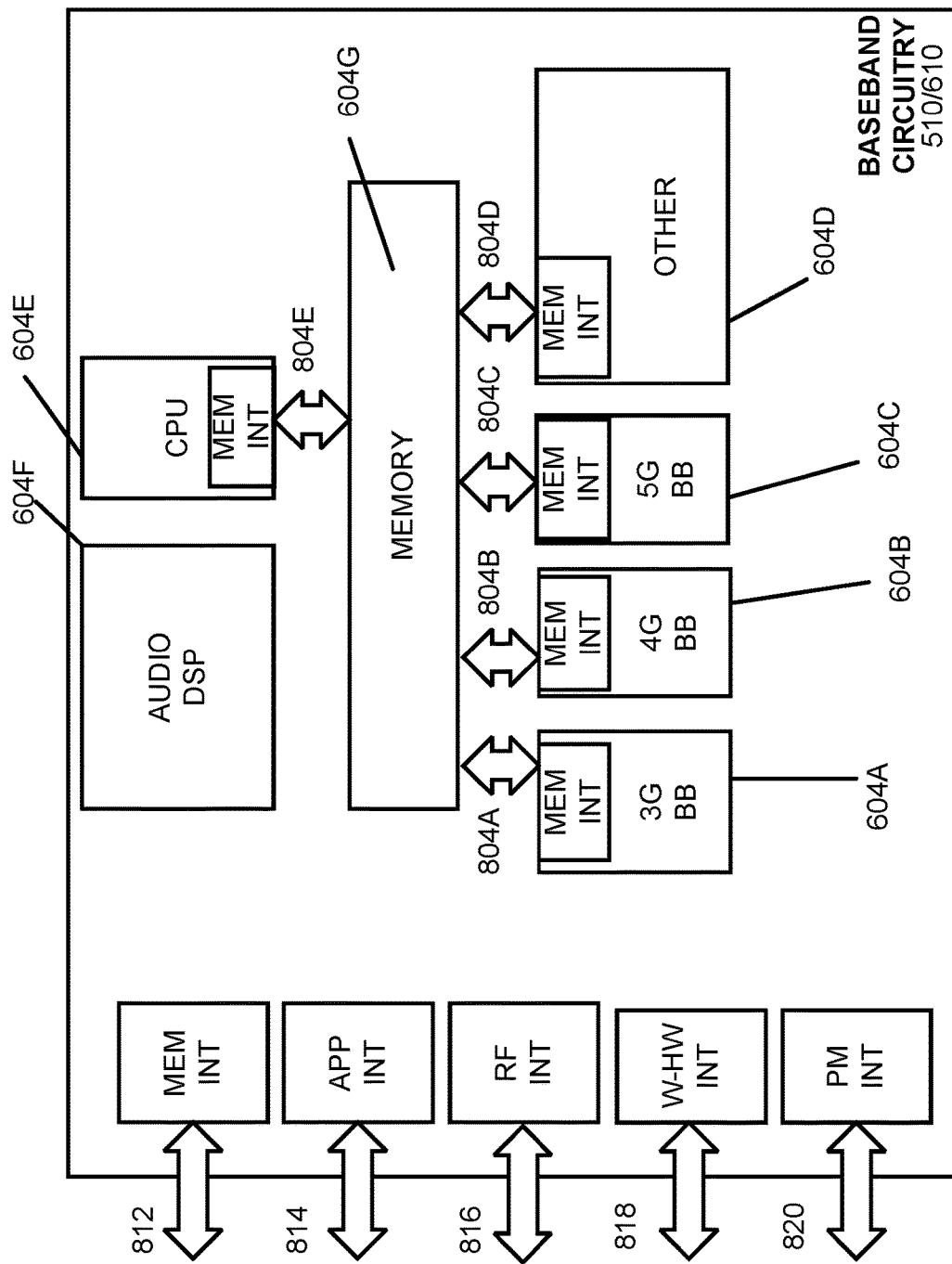
FIG. 8 illustrates example interfaces of baseband circuitry in accordance with some embodiments.

FIG. 8 illustrates example interfaces of baseband circuitry in accordance with some embodiments. As discussed above, the baseband circuitry 510/610 of FIGS. 5-6 may comprise processors 604A-604E and a memory 604G utilized by said processors. Each of the processors 604A-604E may include a memory interface, 804A-804E, respectively, to send/receive data to/from the memory 604G.

The baseband circuitry 510/610 may further include one or more interfaces to communicatively couple to other circuitries/devices, such as a memory interface 812 (e.g., an interface to send/receive data to/from memory external to the baseband circuitry 510/610), an application circuitry interface 814 (e.g., an interface to send/receive data to/from the application circuitry 505/605 of FIGS. 5-6), an RF circuitry interface 816 (e.g., an interface to send/receive data to/from RF circuitry 606 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMIC 625.

Figure 9:
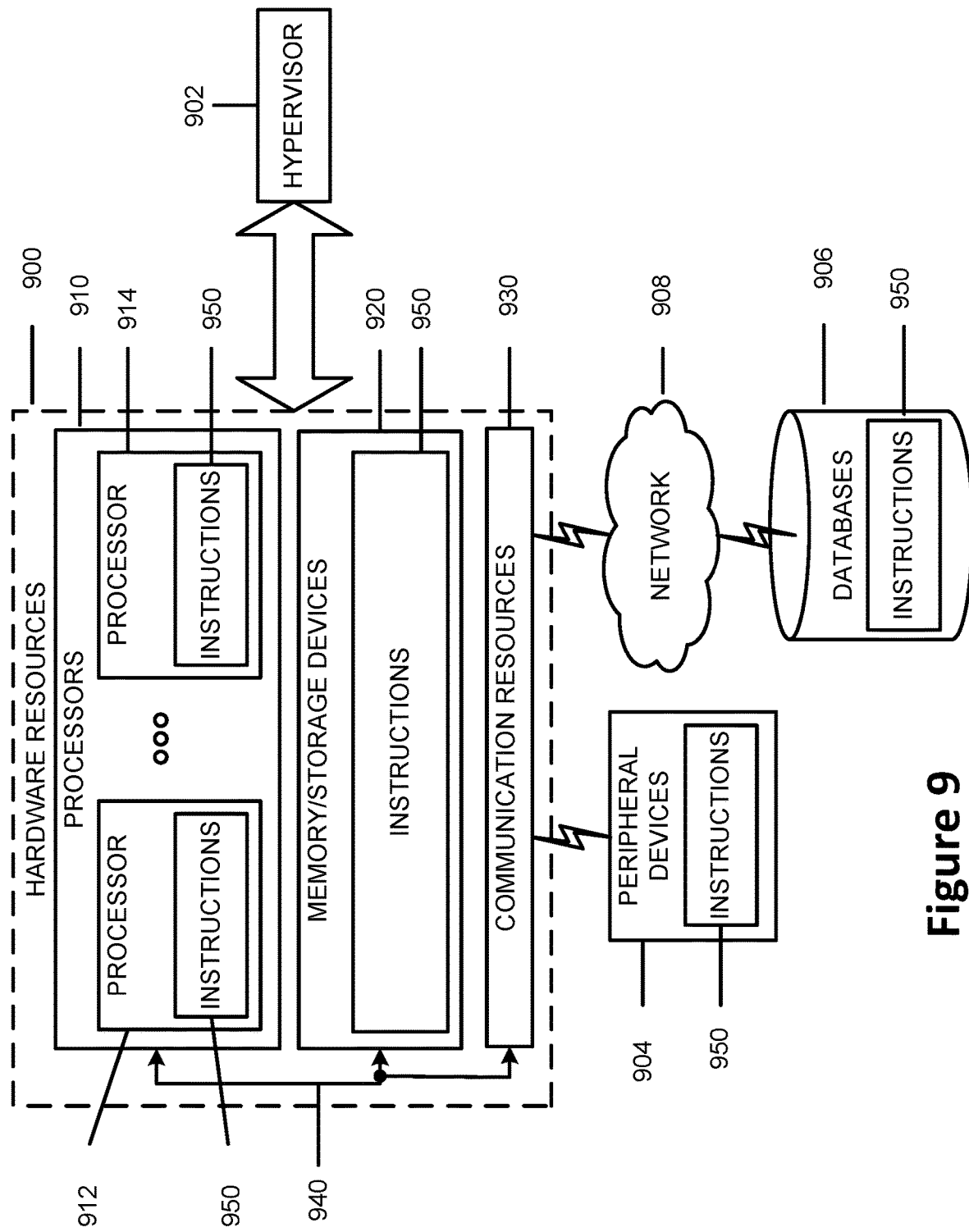
FIG. 9 is a block diagram illustrating components, according to some example embodiments, able to read instructions from a machine-readable or computer-readable medium (e.g., a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 902 may be executed to provide an execution environment for one or more network slices/sub-slices to utilize the hardware resources 900. A "virtualized resource" may refer to compute, storage, and/or network resources provided by virtualization infrastructure to an application, device, system, etc.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914.

The memory/storage devices 920 may include main memory, disk storage, or any suitable combination thereof. The memory/storage devices 920 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

In some embodiments, the electronic device(s), network(s), system(s), chip(s) or component(s), or portions or implementations thereof, of any figure herein may be configured to perform one or more processes, techniques, or methods as described herein, or portions thereof.

Some non-limiting Examples of various embodiments are provided below.

Example 1 is one or more non-transitory, computer-readable media having instructions stored thereon that, when executed, cause a user equipment (UE) to: receive a modulation and coding scheme (MCS) index; determine, based on the MCS index, that a modulation order to be used for a communication on a wireless cellular network is 1024 quadrature amplitude modulation (QAM); determine, based on the MCS index and a resource allocation for the communication, a first transport block size (TBS) for one multiple input, multiple output (MIMO) layer; determine, based on the first TBS, a second TBS for a transport block of the communication using four MIMO layers according to:

| First TBS | Second TBS |
|---|---|
| 105528 | 422232 |
| 107832 | 422232 |
| 112608 | 452832 |
| 117256 | 471192 |
| 124464 | 501792; | and perform the communication on the wireless cellular network based on the second TBS.

Example 2 is the one or more media of claim 1, wherein, to determine the first TBS based on the MCS index, the UE is to determine a TBS index based on the MCS index and determine the first TBS based on the TBS index and the resource allocation.

Example 3 is the one or more media of claim 1, wherein the determine the second TBS based on the first TBS is performed if the resource allocation for the communication is 28 physical resource blocks (PRBs) or greater.

Example 4 is the one or more media of claim 1, wherein performing the communication includes receiving a physical downlink shared channel (PDSCH) communication.

Example 5 is the one or more media of claim 1, wherein the MCS index is included in a downlink control information (DCI) that further includes scheduling information for the communication.

Example 6 is the one or more media of claim 1, wherein the second TBS has a spectral efficiency closest to a target spectral efficiency among candidate TBSs that provide a coding rate below a coding rate threshold and can be divided into code blocks of the same size, wherein the target spectral efficiency corresponds to a spectral efficiency of the first TBS scaled by four.

Example 7 is the one or more media of claim 6, wherein the coding rate threshold is 0.931.

Example 8 is one or more non-transitory, computer-readable media having instructions stored thereon that, when executed, cause a base station of a wireless cellular network to: determine that a modulation order to be used to transmit a physical downlink shared channel (PDSCH) on the wireless cellular network is 1024 quadrature amplitude modulation (QAM); determine, based on the modulation order and a resource allocation for the PDSCH, a first transport block size (TBS) for one multiple input, multiple output (MIMO) layer; determine, based on the first TBS, a second TBS for a transport block of the PDSCH using four MIMO layers according to:

| First TBS | Second TBS |
|---|---|
| 105528 | 422232 |
| 107832 | 422232 |
| 112608 | 452832 |
| 117256 | 471192 |
| 124464 | 501792; | and transmit one or more MIMO layers of the PDSCH based on the second TBS.

Example 9 is the one or more media of claim 8, wherein the instructions are further to cause the gNB to transmit, to the UE, a modulation and coding scheme (MCS) index to indicate to the UE the modulation order and the first TBS.

Example 10 is the one or more media of claim 8, wherein the determine the second TBS based on the first TBS is performed if the resource allocation for the PDSCH is 28 physical resource blocks (PRBs) or greater.

Example 11 is the one or more media of claim 8, wherein the second TBS has a spectral efficiency closest to a target spectral efficiency among candidate TBSs that provide a coding rate below a threshold and can be divided into code blocks of the same size, wherein the target spectral efficiency corresponds to a spectral efficiency of the first TBS scaled by four.

Example 12 is one or more non-transitory, computer-readable media having instructions stored thereon that, when executed, cause a user equipment (UE) to: receive a downlink control information (DCI) that includes a modulation and coding scheme (MCS) index; determine, based on the MCS index, that a modulation order to be used for a physical downlink shared channel (PDSCH) on a wireless cellular network is 1024 quadrature amplitude modulation (QAM); determine, based on the MCS index and a resource allocation for the PDSCH, a first transport block size (TBS) for one multiple input, multiple output (MIMO) layer; determine, based on the first TBS, a second TBS for a transport block of the PDSCH using two MIMO layers according to:

| First TBS | Second TBS |
|---|---|
| 107832 | 214176 |
| 110136 | 220296 |
| 112608 | 226416 |
| 115040 | 230104 |
| 117256 | 236160 |
| 119816 | 236160 |
| 125808 | 251640; | and receive the PDSCH based on the second TBS.

Example 13 is the one or more media of claim 12, wherein, to determine the first TBS based on the MCS index, the UE is to determine a TBS index based on the MCS index and determine the first TBS based on the TBS index and the resource allocation.

Example 14 is the one or more media of claim 12, wherein the determine the second TBS based on the first TBS is performed if the resource allocation is 56 physical resource blocks (PRBs) or greater.

Example 15 is the one or more media of claim 12, wherein the MCS index is included in a downlink control information (DCI) that further includes scheduling information for the PDSCH.

Example 16 is the one or more media of claim 12, wherein the second TBS has a spectral efficiency closest to a target spectral efficiency among candidate TBSs that provide a coding rate below a threshold, wherein the target spectral efficiency corresponds to a spectral efficiency of the first TBS scaled by two.

Example 17 is an apparatus to be employed by a user equipment (UE), the apparatus comprising: means for receiving a downlink control information (DCI) that includes a modulation and coding scheme (MCS) index; means for determining, based on the MCS index, that a modulation order to be used for a communication on a wireless cellular network is 1024 quadrature amplitude modulation (QAM); means for determining a transport block size (TBS) index based on the MCS index; means for determining, based on the TBS index and a resource allocation for the communication, a first transport block size (TBS) for one multiple input, multiple output (MIMO) layer; means for determining, based on the first TBS, a second TBS for a transport block of the communication using three MIMO layers according to:

| First TBS | Second TBS |
|---|---|
| 105528 | 314888 |
| 107832 | 324336 |
| 110136 | 324336 |
| 115040 | 339112 |
| 117256 | 351224 |
| 119816 | 363336 |
| 125808 | 375448; | and means for performing or causing to perform the communication based on the second TBS.

Example 18 is the apparatus of claim 17, wherein the means to determine the second TBS based on the first TBS is to determine the second TBS based on the first TBS according to the table of claim 16 if the resource allocation is 37 physical resource blocks (PRBs) or greater.

Example 19 is the apparatus of claim 17, wherein the MCS index is included in a downlink control information (DCI) that further includes scheduling information for the PDSCH.

Example 20 is the apparatus of claim 17, wherein the second TBS has a spectral efficiency closest to a target spectral efficiency among candidate TBSs that provide a coding rate below a threshold, wherein the target spectral efficiency corresponds to a spectral efficiency of the first TBS scaled by three.

Example 21 is the apparatus of claim 17, wherein the communication includes a physical downlink shared channel (PDSCH).

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. One or more non-transitory, computer-readable media having instructions stored thereon that, when executed, cause a user equipment (UE) to:
   receive a modulation and coding scheme (MCS) index;
   determine, based on the MCS index, that a modulation order to be used for a communication on a wireless cellular network is 1024 quadrature amplitude modulation (QAM);
   determine, based on the MCS index and a resource allocation for the communication, a first transport block size (TBS) for one multiple input, multiple output (MIMO) layer;
   determine, based on the first TBS, a second TBS for a transport block of the communication using four MIMO layers according to:

| First TBS | Second TBS |
|---|---|
| 105528 | 422232 |
| 107832 | 422232 |
| 112608 | 452832 |
| 117256 | 471192 |
| 124464 | 501792; | and
   perform the communication on the wireless cellular network based on the second TBS.

2. The one or more media of claim 1, wherein, to determine the first TBS based on the MCS index, the UE is to determine a TBS index based on the MCS index and determine the first TBS based on the TBS index and the resource allocation.

3. The one or more media of claim 1, wherein the determine the second TBS based on the first TBS is performed if the resource allocation for the communication is 28 physical resource blocks (PRBs) or greater.

4. The one or more media of claim 1, wherein performing the communication includes receiving a physical downlink shared channel (PDSCH) communication.

5. The one or more media of claim 1, wherein the MCS index is included in a downlink control information (DCI) that further includes scheduling information for the communication.

6. The one or more media of claim 1, wherein the second TBS has a spectral efficiency closest to a target spectral efficiency among candidate TBSs that provide a coding rate below a coding rate threshold and is divided into code blocks of the same size, wherein the target spectral efficiency corresponds to a spectral efficiency of the first TBS scaled by four.

7. The one or more media of claim 6, wherein the coding rate threshold is 0.931.

8. One or more non-transitory, computer-readable media having instructions stored thereon that, when executed, cause a base station (gNB) to:
   determine that a modulation order to be used to transmit a physical downlink shared channel (PDSCH) on a wireless cellular network is 1024 quadrature amplitude modulation (QAM);
   determine, based on the modulation order and a resource allocation for the PDSCH, a first transport block size (TBS) for one multiple input, multiple output (MIMO) layer;
   determine, based on the first TBS, a second TBS for a transport block of the PDSCH using four MIMO layers according to:

| First TBS | Second TBS |
|---|---|
| 105528 | 422232 |
| 107832 | 422232 |
| 112608 | 452832 |
| 117256 | 471192 |
| 124464 | 501792; | and
   transmit one or more MIMO layers of the PDSCH based on the second TBS.

9. The one or more media of claim 8, wherein the instructions are further to cause the gNB to transmit, to a user equipment (UE), a modulation and coding scheme (MCS) index to indicate to the UE the modulation order and the first TBS.

10. The one or more media of claim 8, wherein the determine the second TBS based on the first TBS is performed if the resource allocation for the PDSCH is 28 physical resource blocks (PRBs) or greater.

11. The one or more media of claim 8, wherein the second TBS has a spectral efficiency closest to a target spectral efficiency among candidate TBSs that provide a coding rate below a threshold and is divided into code blocks of the same size, wherein the target spectral efficiency corresponds to a spectral efficiency of the first TBS scaled by four.

12. One or more non-transitory, computer-readable media having instructions stored thereon that, when executed, cause a user equipment (UE) to:
receive a downlink control information (DCI) that includes a modulation and coding scheme (MCS) index;
determine, based on the MCS index, that a modulation order to be used for a physical downlink shared channel (PDSCH) on a wireless cellular network is 1024 quadrature amplitude modulation (QAM);
determine, based on the MCS index and a resource allocation for the PDSCH, a first transport block size (TBS) for one multiple input, multiple output (MIMO) layer;
determine, based on the first TBS, a second TBS for a transport block of the PDSCH using two MIMO layers according to:

| First TBS | Second TBS |
| --- | --- |
| 107832 | 214176 |
| 110136 | 220296 |
| 112608 | 226416 |
| 115040 | 230104 |
| 117256 | 236160 |
| 119816 | 236160 |
| 125808 | 251640; | and
receive the PDSCH based on the second TBS.

13. The one or more media of claim 12, wherein, to determine the first TBS based on the MCS index, the UE is to determine a TBS index based on the MCS index and determine the first TBS based on the TBS index and the resource allocation.

14. The one or more media of claim 12, wherein the determine the second TBS based on the first TBS is performed if the resource allocation is 56 physical resource blocks (PRBs) or greater.

15. The one or more media of claim 12, wherein the MCS index is included in a downlink control information (DCI) that further includes scheduling information for the PDSCH.

16. The one or more media of claim 12, wherein the second TBS has a spectral efficiency closest to a target spectral efficiency among candidate TBSs that provide a coding rate below a threshold, wherein the target spectral efficiency corresponds to a spectral efficiency of the first TBS scaled by two.

17. An apparatus to be employed by a user equipment (UE), the apparatus comprising:
means for receiving a downlink control information (DCI) that includes a modulation and coding scheme (MCS) index;
means for determining, based on the MCS index, that a modulation order to be used for a communication on a wireless cellular network is 1024 quadrature amplitude modulation (QAM);
means for determining a transport block size (TBS) index based on the MCS index;
means for determining, based on the TBS index and a resource allocation for the communication, a first transport block size (TBS) for one multiple input, multiple output (MIMO) layer;
means for determining, based on the first TBS, a second TBS for a transport block of the communication using three MIMO layers according to:

| First TBS | Second TBS |
| --- | --- |
| 105528 | 314888 |
| 107832 | 324336 |
| 110136 | 324336 |
| 115040 | 339112 |
| 117256 | 351224 |
| 119816 | 363336 |
| 125808 | 375448; | and
means for performing or causing to perform the communication based on the second TBS.

18. The apparatus of claim 17, wherein the means to determine the second TBS based on the first TBS is to determine the second TBS based on the first TBS according to the table of claim 16 if the resource allocation is 37 physical resource blocks (PRBs) or greater.

19. The apparatus of claim 17, wherein the MCS index is included in a downlink control information (DCI) that further includes scheduling information for the PDSCH.

20. The apparatus of claim 17, wherein the second TBS has a spectral efficiency closest to a target spectral efficiency among candidate TBSs that provide a coding rate below a threshold, wherein the target spectral efficiency corresponds to a spectral efficiency of the first TBS scaled by three.

21. The apparatus of claim 17, wherein the communication includes a physical downlink shared channel (PDSCH).

* * * * *